United States Patent [19]
Waterbury et al.

[11] Patent Number: 5,372,226
[45] Date of Patent: Dec. 13, 1994

[54] SYSTEM FOR PREVENTING INADVERTENT APPLICATION OF TORQUE CONVERTER LOCK-UP CLUTCH

[75] Inventors: Edwin J. Waterbury, Plymouth; Scott R. Crandall, Wixom, both of Mich.

[73] Assignee: Ford Motor Company, Dearborn, Mich.

[21] Appl. No.: 42,182

[22] Filed: Jun. 24, 1993

[51] Int. Cl.5 .................................... F16H 45/02
[52] U.S. Cl. ............................... 192/3.3; 74/732.1
[58] Field of Search .................... 192/3.3, 3.29; 74/732.1, 733.1, 890; 477/57

[56] References Cited

U.S. PATENT DOCUMENTS

| | | | |
|---|---|---|---|
| 3,730,315 | 5/1973 | Annis et al. | 192/3.3 |
| 3,977,502 | 8/1976 | Chana | 192/3.3 |
| 4,441,385 | 4/1984 | Taga et al. | 74/890 X |
| 4,582,185 | 4/1986 | Grimes et al. | 192/3.3 X |
| 4,876,923 | 10/1989 | Crandall et al. | |
| 4,880,091 | 11/1989 | Hasegawa et al. | 192/3.3 |
| 4,989,702 | 2/1991 | Yoshimura et al. | 192/3.29 |

Primary Examiner—Rodney H. Bonck
Attorney, Agent, or Firm—Frank G. McKenzie; Roger L. May

[57] ABSTRACT

In a circuit for controlling the engaged and disengaged state of a torque converter lockup clutch 54 supplied with pressurized fluid on alternate side of a clutch piston, a first valve 116 regulating magnitude of pressure in a lock circuit 104, 106, 124, which causes the lockup clutch to engage, and maintains a pressure differential between lock pressure and unlock pressure, which causes the lockup clutch to disengage. A shuttle valve 122, supplied with control pressure from a solenoid-operated valve 94 when the lockup clutch is engaged, prevents fluid at lock pressure venting from the lock circuit.

9 Claims, 2 Drawing Sheets

SYSTEM FOR PREVENTING INADVERTENT APPLICATION OF TORQUE CONVERTER LOCK-UP CLUTCH

BACKGROUND OF THE INVENTION

1. Field Of the Invention

This invention pertains to the field of hydraulic controls for automatic transmissions. More particularly the invention pertains to a control system for a torque converter lockup clutch.

2. Description of the Prior Art

U.S. Pat. No. 4,876,923 describes a hydraulic control circuit in which torque converter lockup clutch is pressurized from a source of regulated line pressure through a lockup clutch control valve, which directs pressure to either of two passages to apply and release the lockup clutch. The control valve is supplied with control pressure from a solenoid-operated valve that produces high and low fluid pressure states corresponding to commands to engage and release the lockup clutch. A second control pressure, opposing the effect of the solenoid-operated control pressure, is applied to the control valve when the vehicle operator manually selects certain gear ratios, principally the lowest forward and reverse gear ratios. A line pressure regulator valve produces line pressure, whose magnitude is proportional to the magnitude of the control pressure representing a commanded engine torque output. The pressure produced when the vehicle operator manually selects low gear ratios is applied also to the main regulator valve, which produces a line pressure that varies linearly with engine torque control pressure and increases, in comparison to line pressure and other gear ratios, when low gear ratios are selected. A converter regulator valve limits the magnitude of line pressure directed by the main regulator valve to the converter clutch control valve.

If the solenoid control pressure, which represents a command for lockup clutch engagement or disengagement, is continually present, perhaps the result of an electrical failure or control system malfunction, the presence of the control pressure produced when the vehicle operator selects manually a low gear ratio will overcome the effect of the malfunction and release the torque converter lockup clutch. This action opens the torque converter and makes available to the transmission the torque multiplication capacity of the torque converter. When the transmission operates in its lowest gear ratios, the highest torque capacity of the transmission is assumed, therefore, in this mode of operation and with the torque converter controlled by the system of this invention, the torque multiplication capacity of the torque converter is assured regardless of the pressure state produced by the solenoid-operated control valve.

However, a lockup clutch can engage unintentionally due to several adverse operating conditions. A technique is required to prevent its inadvertent engagement despite the presence of these conditions.

SUMMARY OF THE INVENTION

When an automatic transmission operates at elevated temperatures, with the torque converter unlocked, or at low engine speeds, it is possible that no pressure differential exists across the bypass clutch. In addition, the bypass clutch can inadvertently drift to the engaged condition at very cold temperatures because the magnitude of unlock and lock pressures tend to equalize due to high viscosity of the transmission fluid that circulates through the oil cooler circuit. To overcome these problems and to assure that the torque converter lock-up clutch will not drift inadvertently to the engaged condition when a disengaged condition is commanded, a differential pressure regulator valve and shuttle valve are located in the portions of the transmission hydraulic circuit that control operation of the lockup clutch.

A differential pressure regulator valve and shuttle valve communicate through hydraulic passages with ports of a torque converter clutch control valve, which supplies converter clutch lock and unlock pressure to the portion of the hydraulic circuit that supplies fluid to and returns fluid from the torque converter. Fluid at lock pressure magnitude is regulated to a pressure approximately 20 psi below the magnitude of unlock pressure due to regulation produced by the differential pressure regulator valve using a compression spring balanced against a pressure force developed on the valve spool by unlock pressure. The spool opens and closes lock pressure to an exhaust passage in the valve thereby regulating lock pressure to a desired pressure differential below unlock pressure.

A shuttle valve is supplied with control pressure from a solenoid-operated valve that responds to commands produced by a microprocessor upon executing control algorithms containing computerized logic, on the basis of which the automatic transmission is controlled. When the torque converter is locked upon application of solenoid pressure to the shuttle valve, that valve changes state and prevents hydraulic fluid from being supplied to the differential pressure value through passages that otherwise contain pressure at lock magnitude. A check valve in the torque converter lock circuit prevents oil from draining from the differential pressure valve when the torque converter is filling with hydraulic fluid.

An advantage of the system according to this invention is that the torque converter lockup clutch is prevented from inadvertently moving to an engaged position due to the maintenance of a substantial differential pressure in the lock and unlock circuits.

DESCRIPTION OF THE PREFERRED EMBODIMENT

Figure 1:
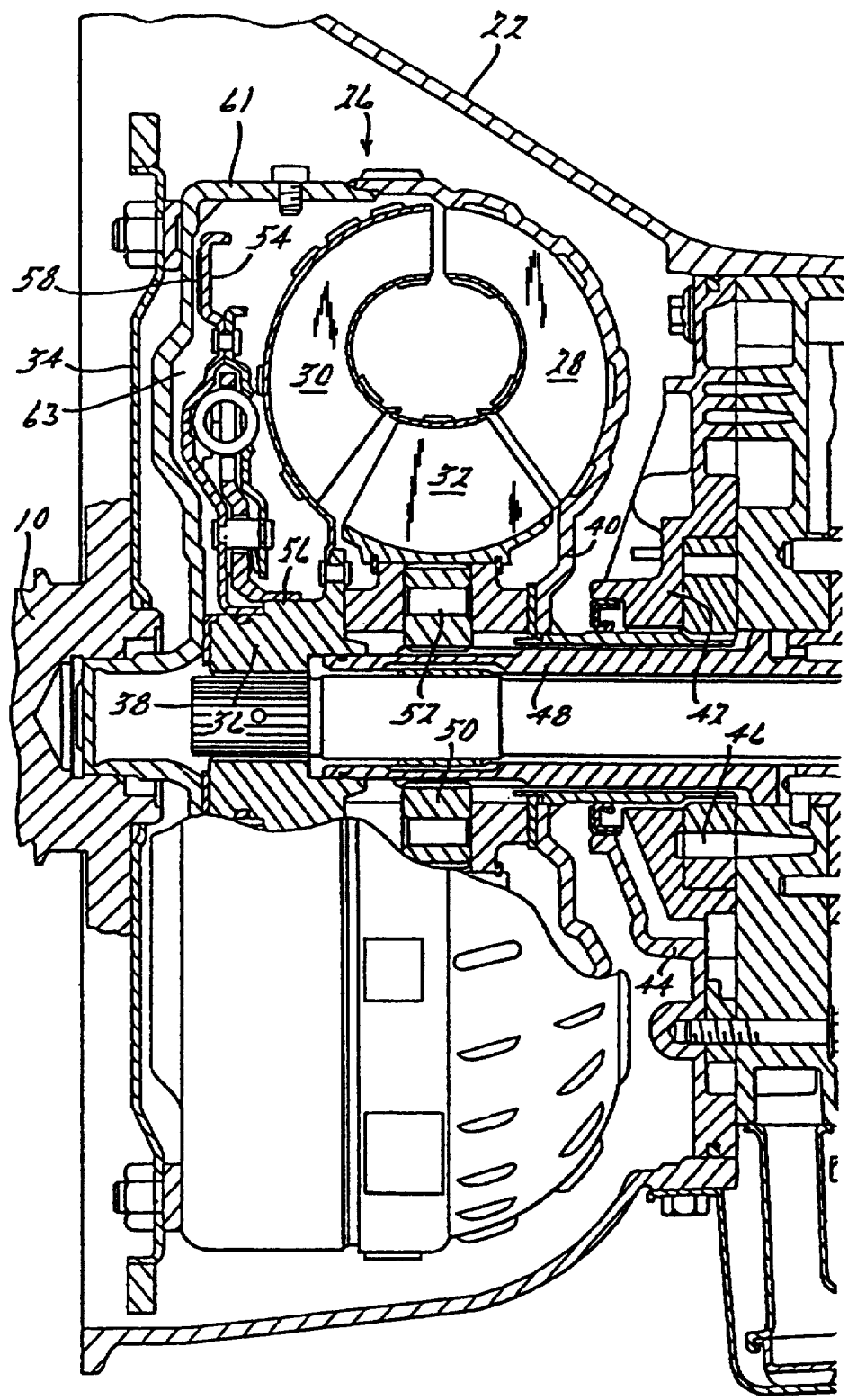
FIG. 1 is a cross section showing, in assembled condition, a hydrokinetic torque converter and the adjacent portions of the transmission.

Referring first to FIG. 1, transmission housing 22 encloses a hydrokinetic torque converter 26, which includes a bladed impeller 28, a bladed turbine 30 and a bladed stator 32. The impeller, turbine and stator are arranged in fluid flow relationship in a common toroidal circuit. The impeller includes a housing connected driveably to drive plate 34, which is bolted to the end of crankshaft 10. Turbine 30 includes a turbine hub 36 splined to turbine shaft 38. Impeller 28 is connected to impeller housing 40, journalled for rotation on a portion 42 of a pump housing, which closes converter housing 22. Pump housing 44 is bolted to housing 22 and encloses gear elements of a positive fixed displacement pump 46, which serves as a pressure source for the control valve system to be described. The pump is supplied with hydraulic fluid through passage 47, and the pump outlet is connected by passages 45,70 to other portions of a hydraulic circuit. A stator sleeve shaft 48 extends from the pump housing 44 and supports the inner race 50 of a one-way clutch 52 whose outer race supports stator 32.

A torque converter bypass or lockup clutch 54 is splined at 56 to the turbine hub 36 and carries a friction surface 58, located at its radially outer end, to engage driveably the torque converter cover 61 welded to the impeller housing. Lockup clutch 54 is closed, locked, applied or engaged to complete a mechanical connection between the impeller and turbine when pressurized hydraulic fluid, contained in the torque converter casing, forces friction surface 58 against the housing. The torque converter is opened, unlocked, released or disengaged so that a hydrodynamic driving connection exists between the impeller and turbine when pressurized hydraulic fluid is supplied through passage 63 between converter cover 61 and friction surface 58 of the lockup clutch to disengage these surfaces.

Figure 2:
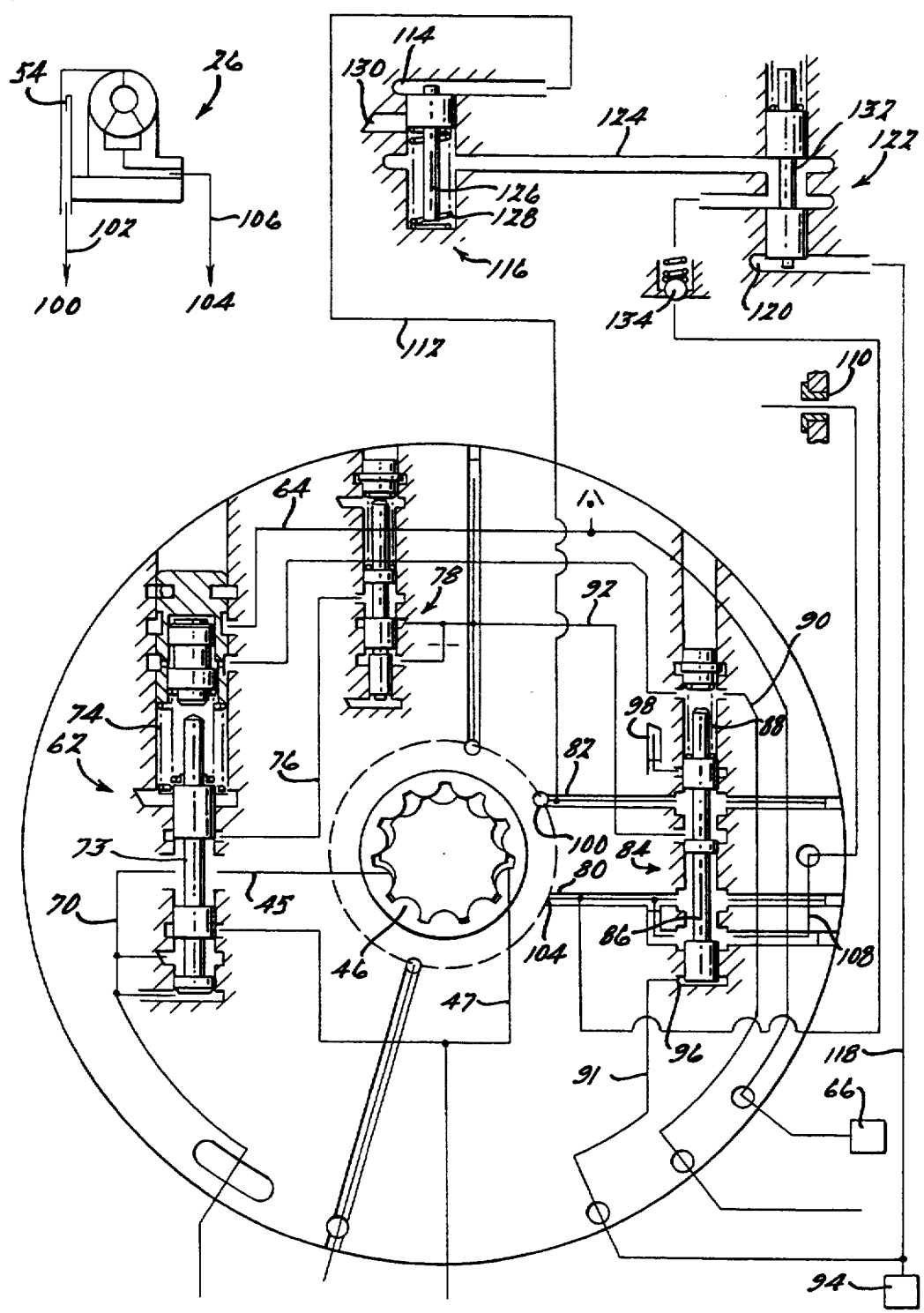
FIG. 2 is a schematic diagram showing a portion of a hydraulic control system capable of engaging and disengaging the lockup clutch of a torque converter.

Line pressure magnitude is controlled by main regulator valve 62 shown in FIG. 2. This valve operates in response to a control pressure carried in line 64 from a TV or electronic pressure control source 66. A variable force solenoid regulates TV pressure in accordance with commanded torque output by the engine by having applied across its winding an electrical voltage duty cycle in accordance with the control of microprocessor output. Hydraulic pressure having a magnitude between 5 psi and 85 psi produced by TV source 66 is applied to the end of line regulator valve 62. When there is demand for a high volume of fluid at line pressure, spool 73 moves downward due to TV pressure operating against the effect of a set of coil springs 74, closes the return line to the suction side 47 of the pump 46, and closes torque converter charge line 76. Then substantially the entire volumetric flow from the discharge side 45 of the pump is carried in passage 70.

The magnitude of pressure in line 70 is a result of upwardly directed differential pressure on the lower end of spool 73 acting against the spring forces and a TV pressure force directed downward on the spool. When line pressure is high in relation to TV pressure, spool 70 moves upward and opens the feedback line 47 to the suction side of the pump. Before this occurs, however, line 76 to converter regulator valve 78 is opened. Thus, line pressure is regulated by balancing the spring forces and TV pressure against line pressure in passage 70.

When a manual valve is moved to the 1 and R positions, line pressure is carried in line 90 to the differential pressure area of the main regulator valve. The pressure developed on the differential area operates to force spool 73 downward so that line pressure is higher when the reverse and M1 ranges are selected than for any of the other settings of the gear selector and manual valve. Higher line pressure in these ranges increases the torque capacity of the clutches and brakes, which are engaged to produce the first gear and reverse drive, while engine torque is near its peak magnitude.

Converter clutch 54 is engaged to lock torque converter 26 by pressurizing line 80 and venting line 82. The converter clutch is disengaged and the torque converter opened when line 82 is pressurized and line 80 is vented. Converter clutch control valve 84 moves upward within the valve body due to a force on spool 86 resulting from converter clutch solenoid pressure carried in line 91, the source of a first control pressure. Valve 84 is forced downward by the helical spring 88 and a pressure force resulting from 1 − R pressure carried in line 90 to the upper end of spool 86. Also, control valve 84 is supplied through line 92 with regulated converter feed pressure from converter regulator valve 78, which regulates converter feed pressure in line 92 by sensing the pressure in line 92 and throttling converter charge pressure in line 76. When converter clutch solenoid valve 94, and first control port 96 are pressurized, line 91 is pressurized, and spool 86 moves upward against the force of the spring 88 to connect lines 92 and 80. When this occurs, line 82 is connected by valve 84 to vent port 98 and converter clutch 54 is engaged.

When solenoid valve 94 is deenergized, line 91 is vented causing spool 86 to move downward, closing the connection between lines 92 and 80, closing the connection of line 82 to vent 98, and opening a connection between lines 92 and 82. This vents line 80 through valve 84 and a hydraulic fluid cooler to the sump of the transmission. This action opens the torque converter by disengaging the mechanical connection of impeller 28 and turbine 30 made through clutch 54. The 1 − R pressure, in addition to increasing line pressure for a given TV pressure, as described with respect to the operation of valve 62, also operates to open the torque converter if solenoid valve 94 remains open while the gear selector is moved to the M1 or R positions, perhaps due to failure of the solenoid that operates valve 94, a short circuit or other electrical fault. This 1 − R pressure assures the torque converter will be open if the gear selected is located in the R and M1 positions so that the torque multiplication effect of the converter is available to maximize torque to output shaft 12. Converter regulator valve 78 limits torque converter feed pressure to approximately 110 psi.

A line modulator valve is connected to regulated line pressure passage 70, and to TV pressure.

To disengage the lockup clutch, unlock pressure in passage 82 is connected through port 100 and passage 102 to the space located between the impeller casing 61 and a friction surface of lockup clutch 54. Fluid passing clutch 54 enters the torus of torque converter 26 formed by the impeller, turbine and stator, flows clockwise in the converter, and returns from the torque converter through port 104 and passage 106. The returning fluid passes through control valve 84 and passage 108 to a cooler 110 located in the vehicle radiator, wherein fluid temperature decreases due to heat exchange with ambient air. From the cooler the fluid is directed to the rear of the transmission where it lubricates various surfaces and returns to a low .pressure sump from which it is drawn to the pump inlet in passage 47.

To engage the lockup clutch, fluid at lock pressure is connected through port 104 and passage 106 to the torus of the torque converter, flows counterclockwise in the converter and forces the friction surface of lockup clutch 54 into engagement with the impeller casing 61, thereby driveably connecting the turbine and impeller. Fluid returns through passage 102, port 100 and exhaust port 98 to the sump.

When torque converter lockup clutch 54 is unlocked, fluid at unlock pressure magnitude is connected by passage 112 to a control port 114 of a differential pressure valve 116, and control pressure from solenoid-operated valve 94 is connected by passage 118 to port 120 of shuttle valve 122.

When clutch 54 is unlocked, valve 116 regulates pressure in the lock circuit at 39.5 psi when pressure in the unlock circuit is 60 psi. This regulation of lock pressure in passage 124 results by moving valve 116 in response to a pressure force on the end of spool 126 due to unlock pressure and the force of spring 128. These forces open and close passage 124 to exhaust port 130. If unlock pressure rises to 120 psi, lock pressure is regulated to 99.4 psi.

When clutch 54 is engaged, control pressure from source 94 (50 psi) forces spool 132 of shuttle valve 122 upward, thereby preventing fluid at lock pressure in passage 124 from exhausting at valve 116.

A check valve 134 in the lock circuit prevents fluid from draining through valve 122 when the torque converter is being filled with fluid.

Therefore, a pressure difference between the lock and unlock circuits is maintained at substantially 20 psi, and valves 116 and 122 operate to prevent inadvertent engagement of clutch 54.

We claim:

1. A system for controlling operation of a torque converter of an automatic transmission, the torque converter having an impeller driveably connectable to a power source and a turbine releasably connectable to the impeller, comprising:

a lockup clutch for connecting and releasing the impeller and turbine;

a first source of fluid pressure;

a low pressure exhaust;

a first circuit connected to a first side of said clutch, fluid pressure in said first circuit operating to disengage the clutch;

a second circuit connected to a second side of said clutch, fluid pressure in said second circuit operating to engage the clutch;

control valve means communicating with said first circuit, second circuit, exhaust and first pressure source, for connecting the first pressure source to the first circuit and the second circuit to said exhaust, and alternately for connecting the first pressure source to the second circuit and the first circuit to said exhaust; and a regulator valve for maintaining differential pressure across the clutch when the first circuit is connected to the first pressure source including a spool having a control land, movable in a bore;

an exhaust port communicating with the bore, opened and closed by the control land;

a first port communicating with the bore and the second circuit, a connection between the exhaust port and the second circuit opened and closed by the control land;

a second port communicating with the first circuit; and a spring urging the control land by force applied to the spool to a position where the control land opens communication between the second circuit and the exhaust port, the spring force opposed by a pressure force on the spool due to communication with the first circuit, the spring force aided by a pressure force on the spool due do communication with the second circuit.

2. The system of claim 1 wherein said regulator value regulates pressure in the second circuit to a lower magnitude than pressure in the first circuit while the first circuit is connected to the first pressure source.

3. The system of claim 1 further comprising means located in the second circuit for preventing fluid from entering said exhaust while the second circuit is connected to the pressure source.

4. The system of claim 3 wherein the preventing means comprises:

a second fluid pressure source having a first state representing engagement of the clutch and a second state representing disengagement of the clutch;

shuttle valve means located in the second circuit, responsive to the first state of the second pressure source for closing a connection between the second circuit and said exhaust while the second circuit is connected to the first pressure source.

5. The system of claim 4 wherein the shuttle valve means comprises:

a spool having a control land, movable in a bore;

a first port communicating with the bore and maintaining means, a connection between the bore and maintaining means opened and closed by the control land;

a second port communicating with the second pressure source;

a spring urging the control land by force applied to the spool to a position where the control land opens communication between the second circuit and exhaust port, the spring force opposed by a pressure force on the spool due to communication with the second pressure source.

6. A system for controlling operation of a torque converter of an automatic transmission, the torque converter having an impeller driveably connectable to a power source and a turbine releasably connectable to the impeller, comprising:

a lockup clutch for connecting and releasing the turbine and impeller;

a first source of fluid pressure;

a low pressure exhaust;

a first circuit connected to a first side of said clutch, fluid pressure in said first circuit operating to disengage the clutch;

a second circuit connected to a second side of said clutch, fluid pressure in said second circuit operating to engage the clutch;

control valve means communicating with said first circuit, second circuit, exhaust and first pressure source, for connecting the first pressure source to the first circuit and the second circuit to said exhaust, and alternately for connecting the first pressure source to the second circuit and the first circuit to said exhaust;

a second fluid pressure source having a first state representing engagement of the clutch and a second state representing disengagement of the clutch;

means located in the second circuit, responsive to the second pressure source, for preventing fluid from entering said exhaust while the second circuit is connected to the first pressure source; and a regulator valve for maintaining differential pressure across the clutch when the first circuit is connected to the first pressure source, including a spool having a control land, movable in a bore;

an exhaust port communicating with the bore, opened and closed by the control land;

a first port communicating with the bore and the second circuit, a connection between the exhaust port and the second circuit opened and closed by the control land;

a second port communicating with the first circuit;

a spring urging the control land by force applied to the spool to a position where the control land opens communication between the second circuit and the exhaust port, the spring force opposed by a pressure force on the spool due to communication with the first circuit, the spring force aided by a pressure force on the spool due do communication with the second circuit.

7. The system of claim 6 wherein said regulator value regulates pressure in the second circuit to a lower magnitude than pressure in the first circuit while the first circuit is connected to the first pressure source.

8. The system of claim 6 wherein the preventing means comprises:

shuttle valve means located in the second circuit, responsive to the first state of the second pressure source for closing a connection between the second circuit and said exhaust while the second circuit is connected to the first pressure source.

9. The system of claim 8 wherein the shuttle valve means comprises:

a spool having a control land, movable in a bore;

a first port communicating with the bore and maintaining means, a connection between the bore and maintaining means opened and closed by the control land;

a second port communicating with the second pressure source; a spring urging the control land by force applied to the spool to a position where the control land opens communication between the second circuit and exhaust port, the spring force opposed by a pressure force on the spool due to communication with the second pressure source.

* * * * *